United States Patent
Yan et al.

(10) Patent No.: US 10,852,136 B2
(45) Date of Patent: Dec. 1, 2020

(54) FREQUENCY MISMATCH DETECTION METHOD FOR MODE MATCHING IN GYROSCOPES

(71) Applicant: Analog Devices, Inc., Norwood, MA (US)

(72) Inventors: Jiefeng Yan, Andover, MA (US); Ronald A. Kapusta, Jr., Carlisle, MA (US); Jianrong Chen, Andover, MA (US)

(73) Assignee: Analog Devices, Inc., Norwood, MA (US)

( * ) Notice: Subject to any disclaimer, the term of this patent is extended or adjusted under 35 U.S.C. 154(b) by 537 days.

(21) Appl. No.: 15/690,504

(22) Filed: Aug. 30, 2017

(65) Prior Publication Data

US 2019/0063923 A1 Feb. 28, 2019

(51) Int. Cl.
  *G01R 23/14* (2006.01)
  *G01C 19/5726* (2012.01)
  *G01C 19/5755* (2012.01)

(52) U.S. Cl.
  CPC ..... *G01C 19/5726* (2013.01); *G01C 19/5755* (2013.01)

(58) Field of Classification Search
  CPC ............. G01C 19/567; G01C 19/574; G01C 19/5712; G01C 19/5726; G01C 19/5755; G01C 19/5776
  See application file for complete search history.

(56) References Cited

U.S. PATENT DOCUMENTS 8,151,641 B2 4/2012 Geen
8,665,031 B2 3/2014 Gilbert
(Continued)

FOREIGN PATENT DOCUMENTS

DE 10248735 A1 5/2004
JP 2005-519296 A 6/2005
(Continued)

OTHER PUBLICATIONS

Ezekwe et al., A Mode-Matching ΣΔ Closed-Loop Vibratory Gyroscope Readout Interface With a 0.004°/s/√Hz Noise Floor Over a 50 Hz Band. IEEE J Solid-State Circ. Dec. 2008;43(12):3039-48.
(Continued)

*Primary Examiner* — Thang X Le
(74) *Attorney, Agent, or Firm* — Wolf, Greenfield & Sacks, P.C.

(57) ABSTRACT

A method for detecting frequency mismatch in microelectromechanical systems (MEMS) gyroscopes is described. Detection of the frequency mismatch between a drive signal and a sense signal may be performed by generating an output signal whose spectrum reflects the physical characteristics of the gyroscope, and using the output signal to determine the frequency $f_C$ of the sense signal. The output signal may be generated by cross-correlating a random or pseudo-random noise signal with a response signal, where the response signal can be obtained by allowing the noise signal to pass through a system designed to have a noise transfer function that mimics the frequency response of the gyroscope. Since the noise signal is random or pseudo-random, cross-correlating the noise signal with the response signal reveals spectral characteristics of the gyroscope. To improve computational efficiency, the cross-correlation can be performed on demodulated versions of the noise signal and the response signal.

20 Claims, 11 Drawing Sheets

(56) References Cited

U.S. PATENT DOCUMENTS

| | | | |
|---|---|---|---|
| 8,667,821 B2 | 3/2014 | Ayazi et al. | |
| 9,671,247 B2 * | 6/2017 | Okon | G01C 19/5776 |
| 9,735,797 B2 | 8/2017 | Zhao et al. | |
| 9,768,793 B2 | 9/2017 | Meng et al. | |
| 9,869,553 B2 * | 1/2018 | Boser | G01C 19/5755 |
| 2003/0167842 A1 | 9/2003 | Platt | |
| 2009/0079607 A1 * | 3/2009 | Denison | A61B 5/7203 |
| | | | 341/143 |
| 2010/0033240 A1 * | 2/2010 | Denison | A61B 5/0002 |
| | | | 330/9 |
| 2011/0041609 A1 | 2/2011 | Clark et al. | |
| 2013/0197858 A1 | 8/2013 | Egretzberger et al. | |
| 2014/0000366 A1 | 1/2014 | Blomqvist | |
| 2017/0023364 A1 * | 1/2017 | Gregory | G01C 19/5776 |
| 2017/0170839 A1 | 6/2017 | Zhao et al. | |
| 2017/0179969 A1 | 6/2017 | Meng et al. | |
| 2018/0128674 A1 | 5/2018 | Kook et al. | |
| 2019/0145773 A1 * | 5/2019 | Collin | G01C 19/5776 |
| | | | 73/504.12 |

FOREIGN PATENT DOCUMENTS

| | | |
|---|---|---|
| JP | 2009-162778 A | 7/2009 |
| JP | 2015-525872 A | 9/2015 |
| WO | WO 2004/038333 A1 | 5/2004 |

OTHER PUBLICATIONS

Witteman, Detection and Signal Processing: Technical Realization. Springer Berlin Heidelberg. 2006;95-106, 119-20.

* cited by examiner

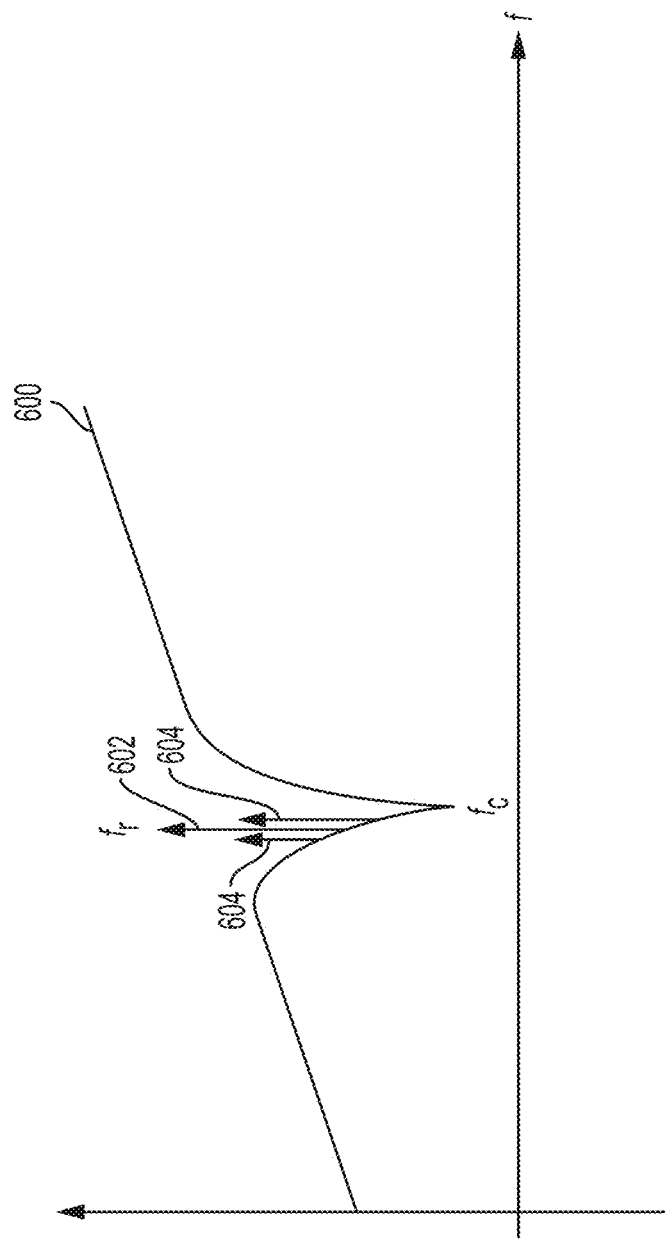

FREQUENCY MISMATCH DETECTION METHOD FOR MODE MATCHING IN GYROSCOPES

FIELD OF THE DISCLOSURE

The present application relates to microelectromechanical system (MEMS) gyroscopes.

BACKGROUND

Microelectromechanical systems (MEMS) gyroscopes are configured to detect angular motion by sensing accelerations produced by Coriolis forces. Coriolis forces arise when a resonant mass of a MEMS gyroscope is subjected to angular motion.

SUMMARY OF THE DISCLOSURE

A method for detecting frequency mismatch in microelectromechanical systems (MEMS) gyroscopes is described. Detection of the frequency mismatch between a drive signal and a sense signal may be performed by generating an output signal whose spectrum reflects the physical characteristics of the gyroscope, and using the output signal to determine the frequency $f_C$ of the sense signal. The output signal may be generated by cross-correlating a random or pseudo-random noise signal with a response signal, where the response signal can be obtained by allowing the noise signal to pass through a system designed to have a noise transfer function that mimics the frequency response of the gyroscope. Since the noise signal is random or pseudo-random, cross-correlating the noise signal with the response signal reveals spectral characteristics of the gyroscope. To improve computational efficiency, the cross-correlation can be performed on demodulated versions of the noise signal and the response signal.

Some embodiments provide a method for detecting a frequency mismatch in a gyroscope. The method may comprise applying a drive signal to the gyroscope, receiving a sense signal from the gyroscope, and detecting a frequency mismatch between the drive signal and the sense signal, the detecting comprising: generating a noise signal, demodulating the noise signal; demodulating a response signal obtained from the sense signal, correlating the demodulated noise signal with the demodulated response signal, and using a result of the correlating to detect the frequency mismatch.

Some embodiments provide a microelectromechanical (MEMS) apparatus. The MEMS apparatus may comprise a gyroscope and circuitry coupled to the gyroscope and configured to: apply a drive signal to the gyroscope, receive a sense signal from the gyroscope, detect a frequency mismatch between the drive signal and the sense signal by: generating a noise signal, demodulating the noise signal, demodulating a response signal obtained from the sense signal, correlating the demodulated noise signal with the demodulated response signal, and using a result of the correlating to detect the frequency mismatch.

Some embodiments provide a microelectromechanical (MEMS) apparatus. The MEMS apparatus may comprise a gyroscope configured to generate a sense signal, a noise shaper having a first input coupled to the gyroscope and configured to receive the sense signal and a second input coupled to an output of a noise generator, a first demodulator coupled to the output of the noise generator, a second demodulator coupled to an output of the noise shaper, and a correlator coupled to the first and second demodulators.

BRIEF DESCRIPTION OF THE DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

FIG. 6 is a plot of a noise transfer function illustrating a case in which the drive signal has a non-zero bandwidth, in accordance with some embodiments of the technology described herein.

DETAILED DESCRIPTION

Figure 1A:
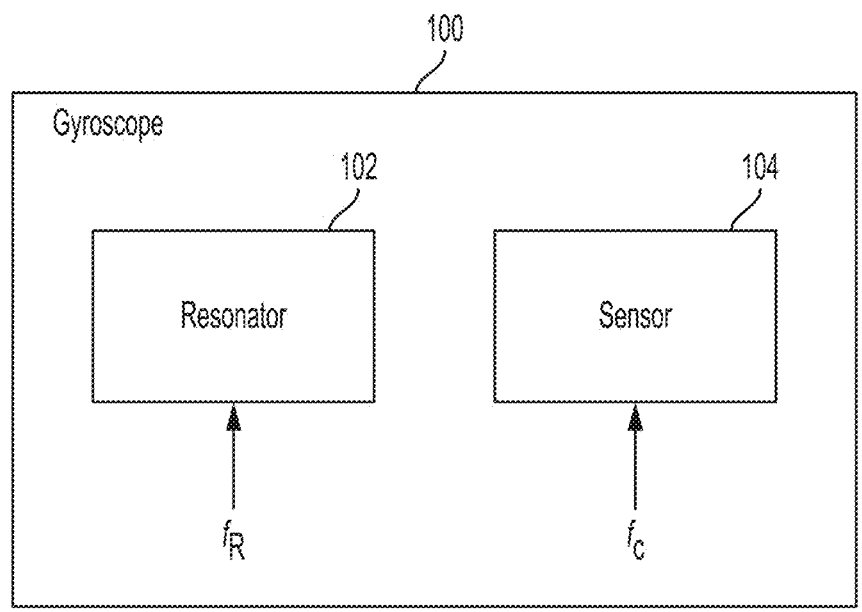
FIG. 1A is a block diagram illustrating a microelectromechanical system (MEMS) gyroscope, in accordance with some embodiments of the technology described herein.

The inventor has appreciated that the response of a microelectromechanical system (MEMS) gyroscope to angular motion may be negatively affected by the presence of a frequency mismatch. The expression "frequency mismatch" is used herein to indicate a difference between a frequency of a signal with which the gyroscope's resonator is excited (which is referred to herein as "the drive signal") and the frequency of a signal produced in response to a Coriolis force (which is referred to herein as the "sense signal"). When a frequency mismatch occurs, the amplitude of the sense signal may be reduced and/or the sense signal may be affected by noise, which leads to inaccurate performance of the gyroscope. The frequency of the sense signal may vary based on physical characteristics of a gyroscope (e.g., temperature, design variations resulting from manufacturing process, etc.) and, as a result, it is unknown whether frequency mismatch will occur during operation of the gyroscope.

The inventor has appreciated that detecting the presence and/or magnitude of the frequency mismatch may be used to compensate for frequency mismatch, for example, by adjusting the drive frequency and/or applying a bias voltage. Accordingly, some aspects of the technology described herein relate to methods and systems for detecting frequency mismatch in MEMS gyroscopes even in the presence of temperature and/or process variations.

In some embodiments, detection of the frequency mismatch between the drive signal and the sense signal may be performed by generating an output signal whose spectrum reflects the physical characteristics of the gyroscope, and using the output signal to determine the frequency $f_C$ of the sense signal. As explained herein, the spectral analysis of the output signal, when performed in accordance with embodiments described herein, may reveal a feature (e.g., a peak or a dip) at frequency $f_C$.

According to one aspect, the output signal may be generated to reflect the characteristics of the gyroscope by leveraging the properties of the cross-correlation operation. For example, the output signal may be generated by cross-correlating a random or pseudo-random noise signal with a response signal, where the response signal is obtained by allowing the noise signal to pass through a system designed to have a noise transfer function that mimics the frequency response of the gyroscope (and where at least a part of the system may be implemented, at least in some embodiments, as a delta-sigma modulator). Since the noise signal is random or pseudo-random (and, as such, its autocorrelation is or is well-approximated by the delta function), cross-correlating the noise signal with the response signal reveals spectral characteristics of the gyroscope.

The inventor has further appreciated that detecting the spectral characteristics of a gyroscope may be computationally expensive, and as such may unnecessarily utilize computational resources that could otherwise be freed for different purposes. Accordingly, the inventor has developed techniques for isolating a confined portion of the spectral characteristics of the gyroscope (e.g., a single frequency or a discrete number of frequencies), and for detecting frequency mismatch based on this confined portion. According to one aspect, isolation of a confined portion is performed by demodulating the noise signal and the response signal with a signal having a carrier substantially equal to the frequency of the drive signal, and by cross-correlating the demodulated signals with one another. Detection of the frequency mismatch may be accomplished at least in some embodiments by determining whether a specific behavior occurs at a predetermined reference frequency (e.g., whether the phase of the result of the cross-correlation is 90° at the direct current (DC) component, i.e., at f=0).

In some embodiments, detection of the frequency mismatch between the drive signal and the sense signal comprises determining whether such frequencies are substantially equal to one another. In some, detection of the frequency mismatch between the drive signal and the sense signal further comprises determining the amount by which the two frequencies are offset from one another. In some embodiments, the amount by which the frequencies are offset from one another is determined, this amount may be used to compensate the gyroscope for the presence of frequency mismatch. For example, when it is determined that the frequency mismatch is equal to $\Delta f$, compensation may be performed by moving the frequency of the drive signal by $\Delta f$ and/or applying a bias voltage whose magnitude depends on $\Delta f$.

FIG. 1 is a block diagram illustrating a gyroscope 100, according to some embodiments. Gyroscope 100 comprises resonator 102 and sensor 104. Resonator 102 is configured to resonate periodically, when driven by a drive signal having a frequency $f_R$. Sensor 104 (which may be an accelerometer in some embodiments) is configured to sense angular velocities. Accordingly, when gyroscope 100 is subjected to angular motion (e.g., when the gyroscope is rotated relative to an axis), the angular rate at which the angular motion occurs (e.g., the rate of rotation) can be sensed using sensor 104.

In some embodiments, gyroscope 100 is configured to sense angular velocities by detecting acceleration arising from the Coriolis effect. The Coriolis effect, and hence a Coriolis force, arises when: 1) resonator 102 resonates; and 2) the gyroscope is subjected to angular motion. In these circumstances, sensor 104 may detect the acceleration resulting from the Coriolis effect. The angular rate associated with the angular motion may be inferred from the acceleration, for example, by using sense circuitry coupled to sensor 104.

In some embodiments, the spectral content of signal produced by sensor 104 in response to a Coriolis force (referred to herein as the "sense signal") depends at least in part on the physical characteristics (e.g., the geometry or the material or materials with which the sensor is made) of sensor 104. For example, in some embodiments, sensor 104 may have a spectral response that exhibits a resonance, and consequently the spectrum of the sense signal may have a (local or global) peak at the resonance.

Figure 1B:
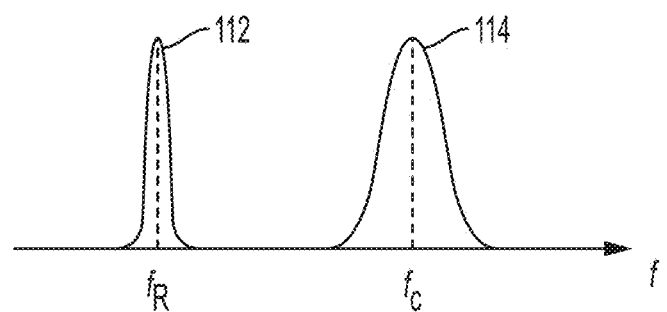
FIG. 1B is a plot illustrating the spectral characteristics of a drive signal and a sense signal, in accordance with some embodiments of the technology described herein.

As discussed herein, the magnitude of the response to angular motion can be enhanced by matching the frequency of the drive signal to the peak frequency of the sense signal. However, the ability to match these frequencies to one another may be limited may the fact that the characteristics of sensor 104 may not be known prior to operation of the gyroscope, and as a result frequency $f_C$ is unknown. Consequently, frequencies $f_C$ and $f_R$ (the frequency of the drive signal) may not be equal or substantially equal to one another. One such example is shown in FIG. 1B, which illustrates the spectrum 112 of a drive signal and the spectrum 114 of a sense signal. As shown, frequency $f_R$ is different from $f_C$ in this case.

Resonator 102 and sensor 104 may be arranged in any suitable way. In some embodiments, resonator 102 includes a mass and sensor 104 include a separate mass. In other embodiments, resonator 102 and sensor 104 share the same mass.

Figure 2:
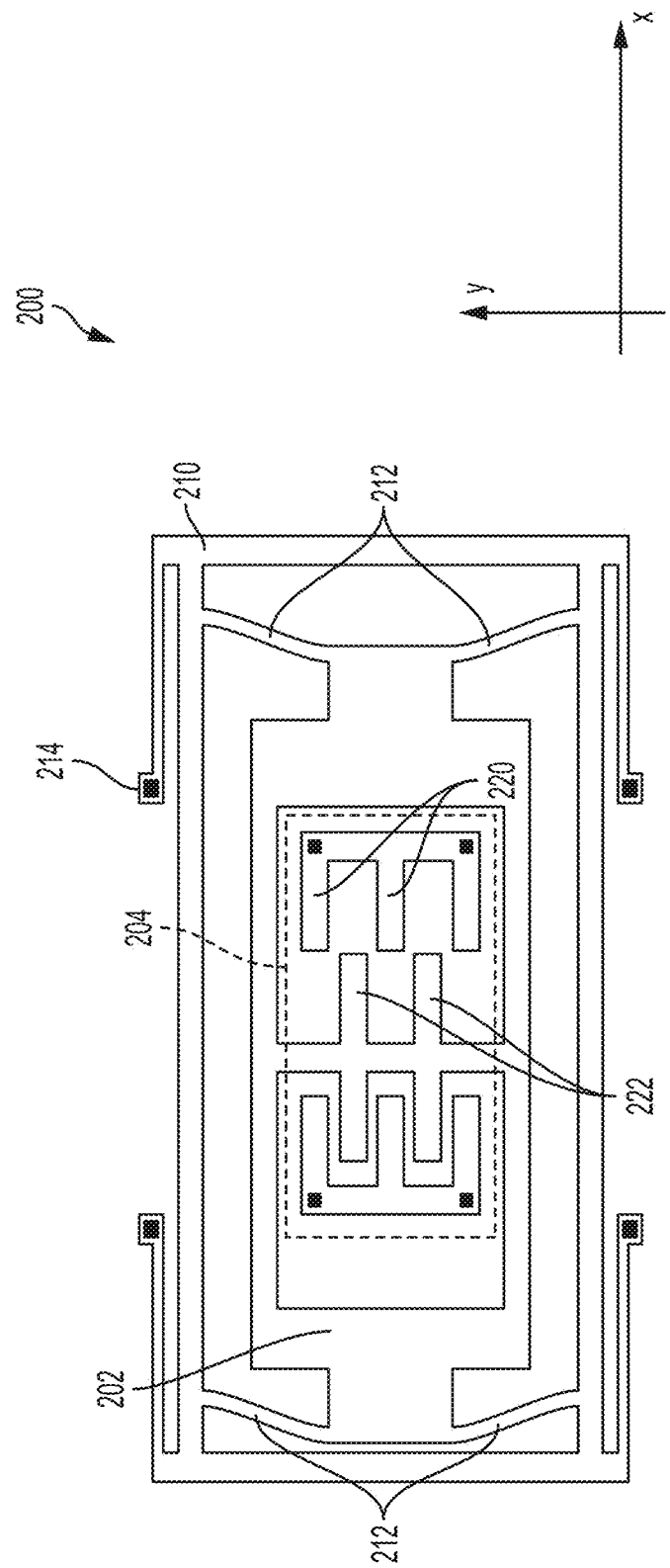
FIG. 2 is a schematic illustration of an illustrative MEMS gyroscope, in accordance with some embodiments of the technology described herein.

One example implementation of gyroscope 100 is illustrated in FIG. 2. In this example, gyroscope 200 is configured to resonate in a direction parallel to the x-axis and to detect Coriolis forces in a direction parallel to the y-axis. It should be appreciated that gyroscopes of the types described herein are not limited to any specific direction of resonance or detection. Gyroscope 200 includes a stationary frame 210 (anchored to an underlying substrate via anchors 214), proof mass 202, and stationary electrodes 220. Proof mass 202 is elastically coupled to stationary frame 210 via couplers 212. Couplers 212 may be compliant, thus allowing for motion of proof mass 202 relative to stationary frame 210. In this example, proof mass 202 serves as resonator 102. Accordingly, when a drive signal is applied to one or more electrodes (not shown in FIG. 2) coupled to proof mass 202, proof mass 202 oscillates back and forth along the x-axis, where the periodicity of the oscillation is determine by (e.g., is equal to) the frequency $f_R$ of the drive signal.

Proof mass 202 includes a plurality of free-end beams 222, which form a plurality of sense capacitors with respective fixed electrodes 220. The sense capacitors may sense motion of the proof mass along the y-axis, such that the capacitance of the sense capacitors depends on the acceleration of the proof mass. Accordingly, free-end beams 222 and fixed electrodes collectively form sensor 204, which may serve as sensor 104.

When gyroscope 200 is subjected to angular motion about the x-axis and proof mass 202 is driven to oscillate along the x-axis, a Coriolis force along the y-axis arises and the proof mass moves along the y-axis. By detecting the acceleration of proof mass 202 along the y-axis, using sensor 204, the angular velocity can be inferred. As discussed above, the frequency of the signal generated by sensor 204 (the sense signal) and the frequency of the drive signal may be offset from one another.

Figure 3:
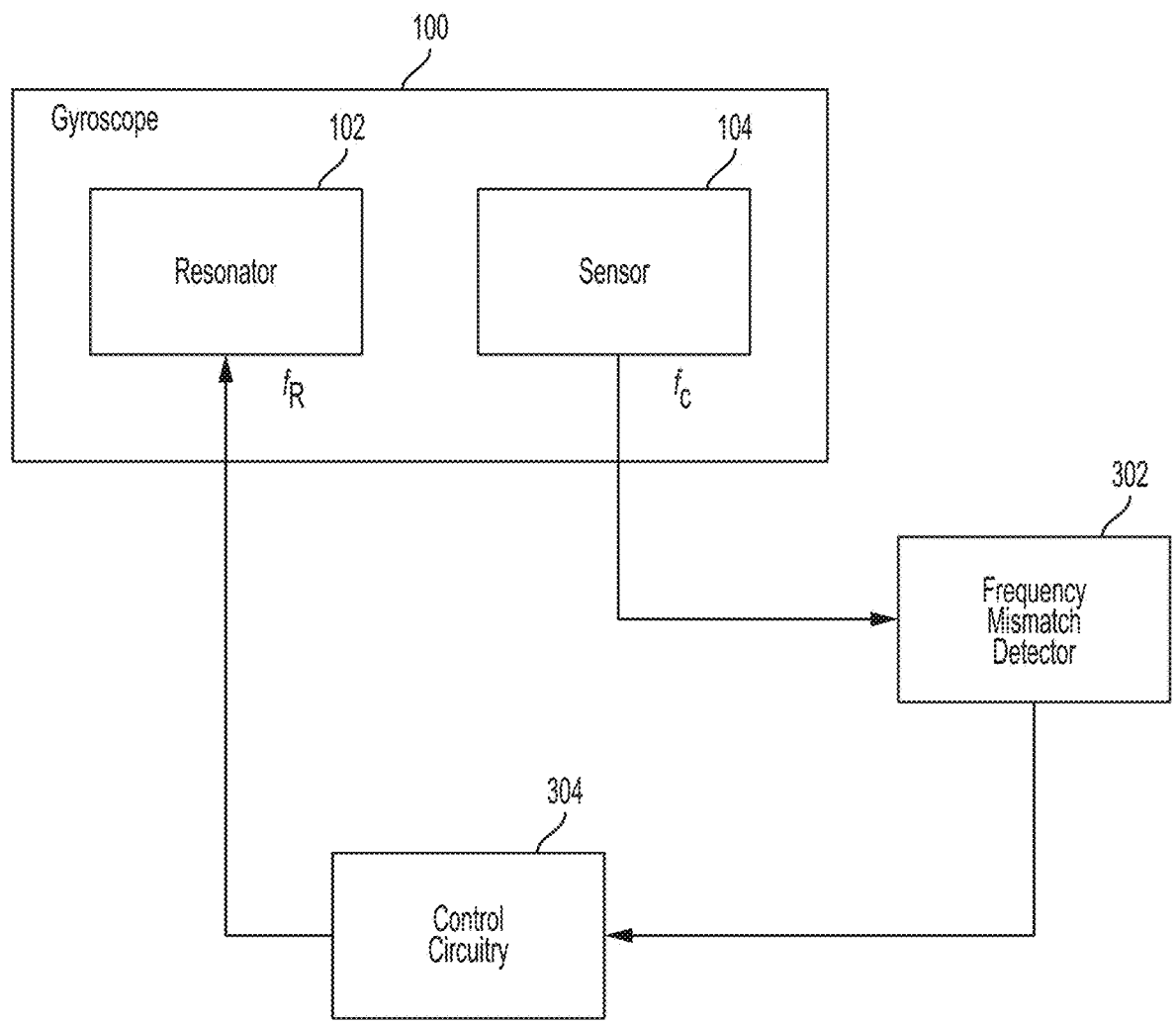
FIG. 3 is a block diagram of an illustrative system for compensating a MEMS gyroscope for mismatch of drive signal frequency and sense signal frequency, in accordance with some embodiments of the technology described herein.

In some embodiments, gyroscope 200 may be compensated for frequency mismatch between the frequency of the drive signal and that of the sense signal. An example of a system for compensating gyroscope 100 for frequency mismatch is shown in FIG. 3. In some embodiments, the sense signal is given by the product of the drive signal and an input angular rotation rate Ω. As illustrated, gyroscope 100 is coupled to frequency mismatch detector 302 and control circuitry 304. Frequency mismatch detector 302 receives a sense signal from sensor 104, and detects a frequency mismatch (e.g., determines whether the frequencies are substantially equal to one another, and/or determines the amount by which they are mismatched). In at least some of the embodiments in which frequency mismatch detector 302 determines the amount of mismatch, control circuitry 304 may be used to adjust the frequency of the drive signal applied to resonator 102. In some embodiments, the amount by which the frequency $f_R$ is moved relative to its initial value depends on the amount by which frequencies $f_R$ and $f_C$ are offset from one another. For example, the larger the mismatch, the larger the extent to which frequency $f_R$ is moved. Examples of frequency mismatch detectors are provided further below. Control circuitry 304 may be implemented in any suitable way, including but not limited to a proportional (P) controller, an integral (I) controller, a derivative (D) controller, or any suitable combination thereof. Gyroscope 100, frequency mismatch detector 302 and control circuitry 304 may be disposed on the same substrate (e.g., a silicon chip), or on separate substrates.

Figure 4A:
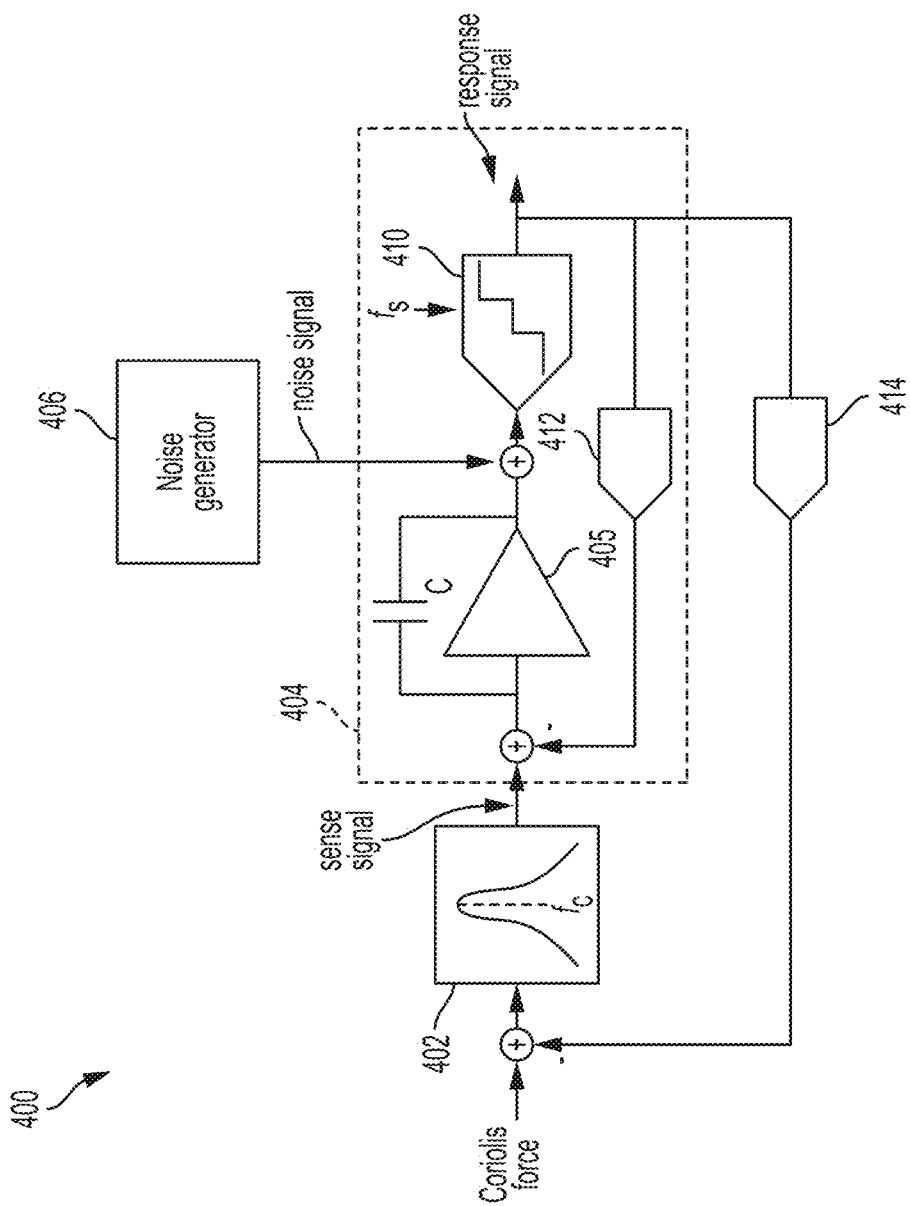
FIG. 4A is a block diagram illustrating a portion of an example system for detecting frequency mismatch in a MEMS gyroscope, in accordance with some embodiments of the technology described herein.

In some embodiments, detection of the frequency mismatch between a drive signal and a sense signal, may comprise generating a noise signal, demodulating the noise signal and a response signal obtained from the sense signal, correlating the demodulated noise signal with the demodulated response signal, and using a result of the correlation to detect the frequency mismatch. An example of a system 400 for detecting frequency mismatch is shown in FIG. 4A. System 400 includes sensor 402 (which may represent sensor 104), noise shaper 404, noise generator 406, and digital-to-analog converter (DAC) 414. In some embodiments, noise shaper 404 includes amplifier 405 and capacitor C (which may collectively form a low-pass filter such as an integrator), quantizer 410, and DAC 412.

Noise shaper 404 may be configured to shape the noise transfer function of system 400 to depend, at least partially, from the spectral characteristics of sensor 402. For example, if sensor 402 exhibits a peak at frequency $f_C$, the noise transfer function of system 400 may exhibit a dip at frequency $f_C$. Amplifier 405, capacitor C, quantizer 410 and DAC 412 may collectively form a delta-sigma modulator. Noise shaper 404 is not limited to delta-sigma modulators, as other implementations are also possible. Spectral characteristics of the system may be represented in any suitable way, including by way of example, a power spectral density, a frequency response, transfer function, an impulse response, an autocorrelation function, etc.

Sensor 402 may receive as an input a Coriolis force, and may in response produce a sense signal (provided that the corresponding resonator is resonating). The sense signal is passed through noise shaper 404. In some embodiments, a noise signal generated using noise generator 406 is injected in the noise shaper 404 (for example, between the output of amplifier 405 and the input of quantizer 410). The noise signal may be a random signal (e.g., white noise or pink noise) having a low auto-correlation. In some embodiments, noise generator 406 is implemented as a pseudo-random bit sequence (PRBS) generator, and the noise signal is a PRBS.

In the embodiments in which noise shaper 404 includes quantizer 410, quantizer 410 may be used to sample the signal obtained by combining a filtered version (for example using amplifier 405 and capacitor C) of the sense signal with the noise signal. The sampling frequency $f_S$ of the quantizer 410 may be at least twice the frequency $f_C$ of the sense signal. The signal output by noise shaper 404 is referred to herein as the "response signal." The response signal may be representative of the magnitude of the Coriolis force, and accordingly, of the angular velocity to which the gyroscope is subjected. DAC 414 may form a feedback loop and may be configured to extend the bandwidth of system 400, which may otherwise be overly narrow when frequencies $f_C$ and $f_R$ are matched.

Figure 4B:
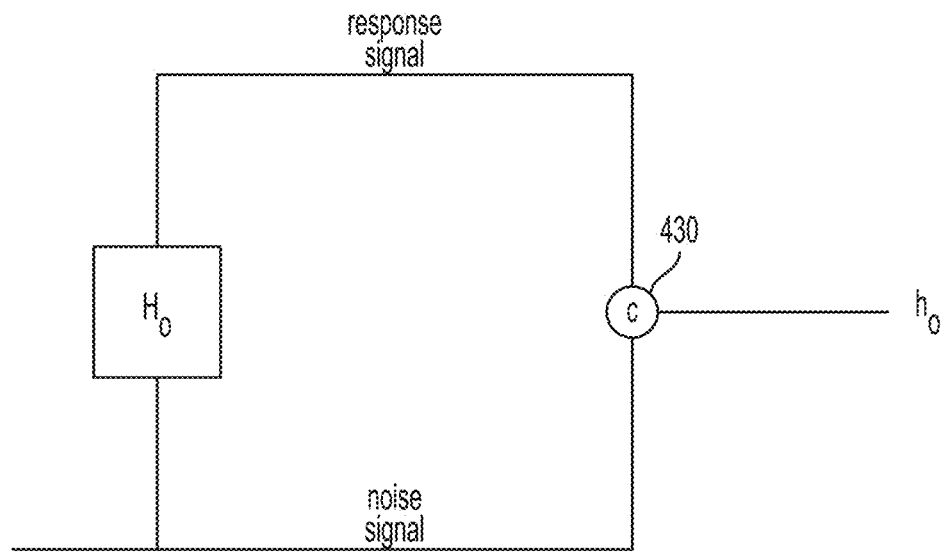
FIG. 4B is a block diagram of another portion of the system of FIG. 4A, in accordance with some embodiments of the technology described herein.

In some embodiments, frequency $f_C$ may be determined by determining the noise transfer function of system 400. One way for determining the noise transfer function of system 400 is to cross-correlate the response signal with the noise signal. FIG. 4B illustrates a cross-correlator 430 receiving the noise signal and the response signal of FIG. 4A. System 400 be modeled as an equivalent block having a transfer function $H_0$. Cross-correlating the noise signal (which has an auto-correlation having a narrow impulse in the origin) with the response signal produces an output signal $h_0$ having a spectrum substantially equal to $H_0$. Therefore, the noise transfer function (and hence, frequency $f_C$) can be detected by detecting the spectrum of output signal $h_0$.

Figure 4C:
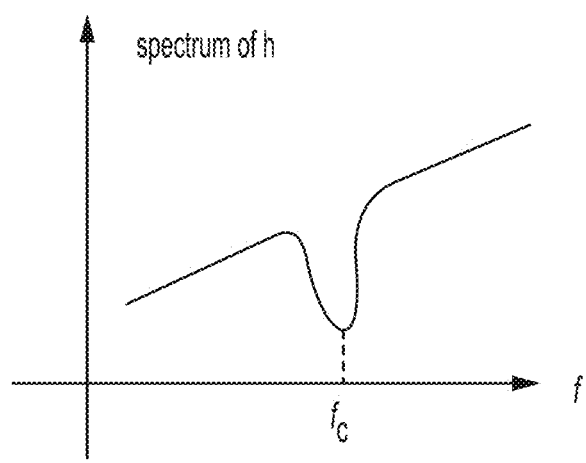
FIG. 4C is a plot illustrating the spectrum of the output of the system of FIG. 4B, in accordance with some embodiments of the technology described herein.

The spectrum of an example output signal $h_0$ is illustrated as a function of frequency in FIG. 4C. As illustrated, the spectrum exhibits a dip at frequency $f_C$, resulting from the fact that sensor 402 has peak at $f_C$. Accordingly, frequency $f_C$ may be detected by detecting the frequency at which the dip occurs. The frequency mismatch between $f_C$ and $f_R$ may in turn be obtained by subtracting $f_C$ from $f_R$ (or vice versa). As can be further appreciated from FIG. 4C, the spectrum exhibits a high-pass behavior because noise shaper 404 is implemented as a delta-sigma modulator in this example.

Figure 4D:
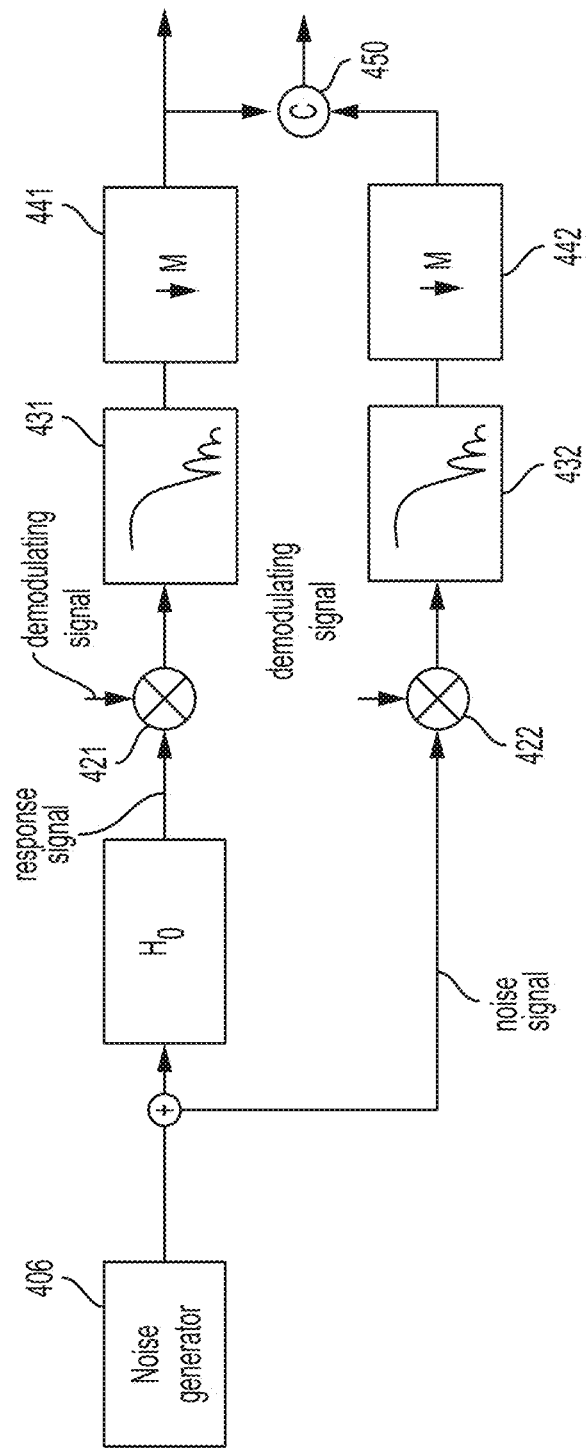
FIG. 4D is another portion of the system of FIG. 4A that can be used in alternative to the system of FIG. 4B, in accordance with some embodiments of the technology described herein.

In some embodiments, the frequency mismatch may be detected without having to determine an extended spectral portion of the noise transfer function, but just by focusing on the region of interest. In this way, computational efficiency may be improved. One example of a system for detecting the frequency mismatch while improving computational efficiency is shown in FIG. 4D. In this example, the response signal and the noise signal are demodulated by a demodulating signal having a carrier that is substantially equal to $f_R$ (e.g., between 90% and 110% or $f_R$). The demodulating signal may be derived from the drive signal. Demodulation of the response signal and the noise signal may be performed by mixing these signals, using mixers 421 and 422 respectively, with the demodulating signal. Optionally, the resulting signals can be filtered using low-pass filters 431 and 432, thus removing the high frequency portions of the spectra.

In some embodiments, the demodulated signals may be passed through decimators 441 and 442 (having a decimation factor M greater than 1). In this way, the number of data samples used for representing the demodulated signals is reduced, thus improving computational efficiency. The demodulated signals may then be cross-correlated using correlator 450.

Figure 5B:
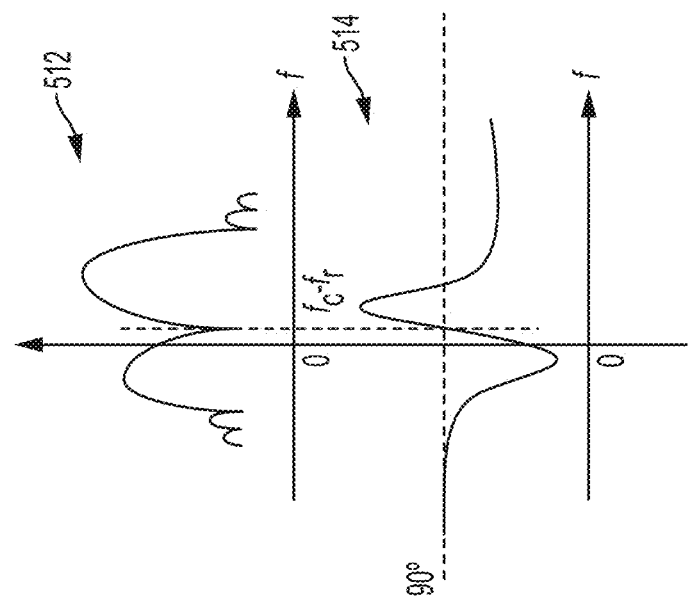
FIG. 5B is a plot illustrating the spectral characteristics of the output of the system of FIG. 4D, in accordance with some embodiments of the technology described herein.
Figure 5A:
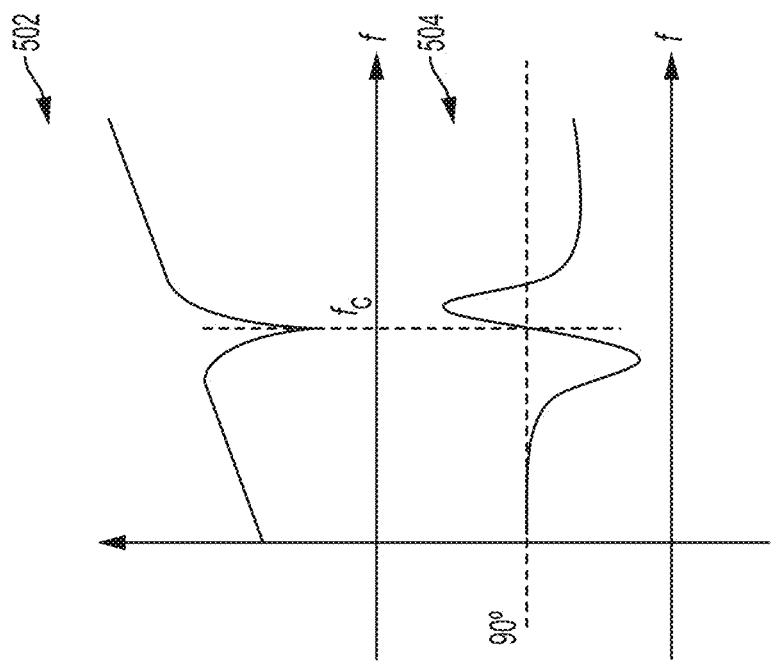
FIG. 5A is a plot illustrating the spectral characteristics of the system of FIG. 4A, in accordance with some embodiments of the technology described herein.
Figure 5C:
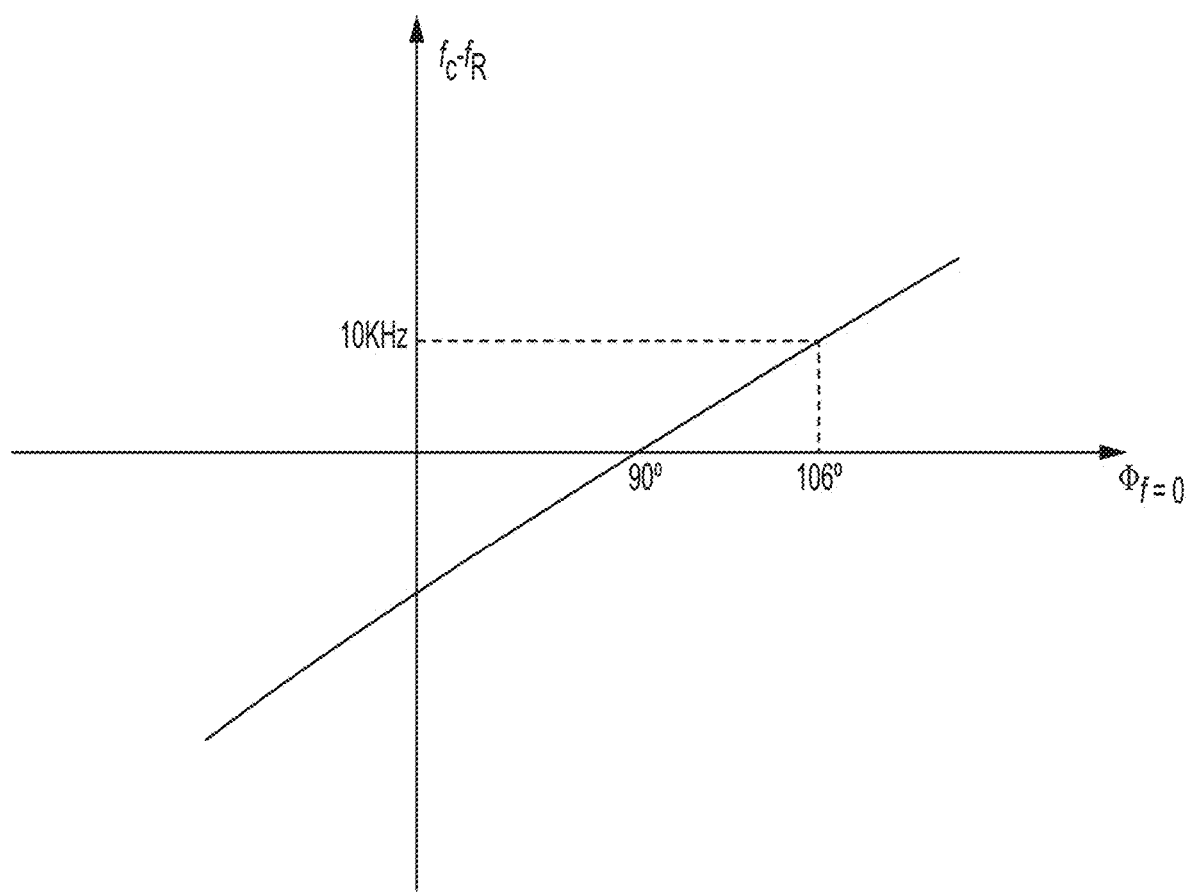
FIG. 5C is a plot illustrating an example calibration curve in which frequency mismatch is plotted as a function of a phase, in accordance with some embodiments of the technology described herein.

FIG. 5A illustrates the amplitude (plot 502) and phase (plot 504) of the noise transfer function of system 400, and FIG. 5B illustrates the amplitude (plot 512) and phase (plot 514) of the signal obtained through correlator 450, according to some embodiment. As shown, the noise transfer function of system 400 exhibits a dip at frequency $f_C$. Correspondingly, the phase is equal to 90°. Since the response and noise signals are demodulated with a frequency substantially equal to $f_R$, the dip in the output of the correlator occurs at frequency $f_C$-$f_R$, as shown in FIG. 5B. Correspondingly, the phase of the output of the correlator exhibits a phase equal to 90° at frequency $f_C$-$f_R$.

In some embodiments, the frequency mismatch may be determined by determining the amplitude and/or the phase of the output of the cross-correlation at a reference frequency. In this way, the amount of data points that needs to be processed is substantially decreased relative to the case in which an extended portion of the spectrum is processed. In one example, detection of the frequency mismatch may be performed by detecting the phase of the output of the correlator at f=0. For example, if the phase at f=0 is 90°, it may be determined that frequencies $f_C$ and $f_R$ are matched. Contrarily, if the phase is greater or less than 90°, it may be determined that the frequencies are offset from one another. The phase at f=0 may be determined, at least in some embodiments, by computing the integral of the output of the correlator. If the result of the integration is such that the real part is equal to zero, it may be determined that the phase is equal to 90°, and that $f_C$=$f_R$.

In some embodiments, the amount by which $f_C$ and $f_R$ are mismatched may be detected by detecting the amount by which the phase differs from 90°. To this end, a calibration procedure may be performed so that the frequency mismatch can be mapped to the phase of the output of the cross-correlation. An example of a calibration curve, obtained with such as a calibration procedure, is shown in FIG. 4E, which plots the frequency mismatch $f_C$-$f_R$ versus the phase at f=0 ($\Phi_{f=0}$). For example, if the $\Phi_{f=0}$ is equal to 106°, it may be determined that the frequency mismatch is equal to 10 KHz. In other embodiments, reference frequencies other than f=0 may be used to detect the frequency mismatch.

In some embodiments, the signal associated with the input angular rotation rate Ω may exhibit a sufficiently broad spectrum relative to the bandwidth of the noise transfer function to distort the shape of the noise transfer function. Under these circumstances, the accuracy of the techniques for detecting frequency mismatch discussed herein may be negatively affected. This effect may be significant when frequency $f_R$ is within the bandwidth of the dip in the noise transfer function. This scenario is shown in the example of FIG. 6, where the noise transfer function is indicated by numeral 600, frequency $f_R$ is indicated by numeral 602, and numerals 604 indicate additional tones. The presence of the additional tones produces a spectral broadening which may affect the ability to accurately detect the frequency mismatch using the techniques described above.

To reduce this effect, in some embodiments, a PRBS may be used as the noise signal that includes a first sub-sequence $d_1(n)$ and a second sub-sequence $d_2(n)$ that is opposite the first sub-sequence. For example, if the first sub-sequence $d_1(n)$ includes the values +1, +1, −1, +1, −1 . . . −1, the second sub-sequence $d_2(n)$ includes the values −1, −1, +1, −1, +1 . . . +1. In some embodiments, the PRBS may be defined by the sequence $d_1(n)$, $d_2(n)$, $d_1(n)$, $d_2(n)$, $d_1(n)$ . . . . In this way, the effect of the non-zero bandwidth may be canceled out (or at least limited).

Figure 7A:
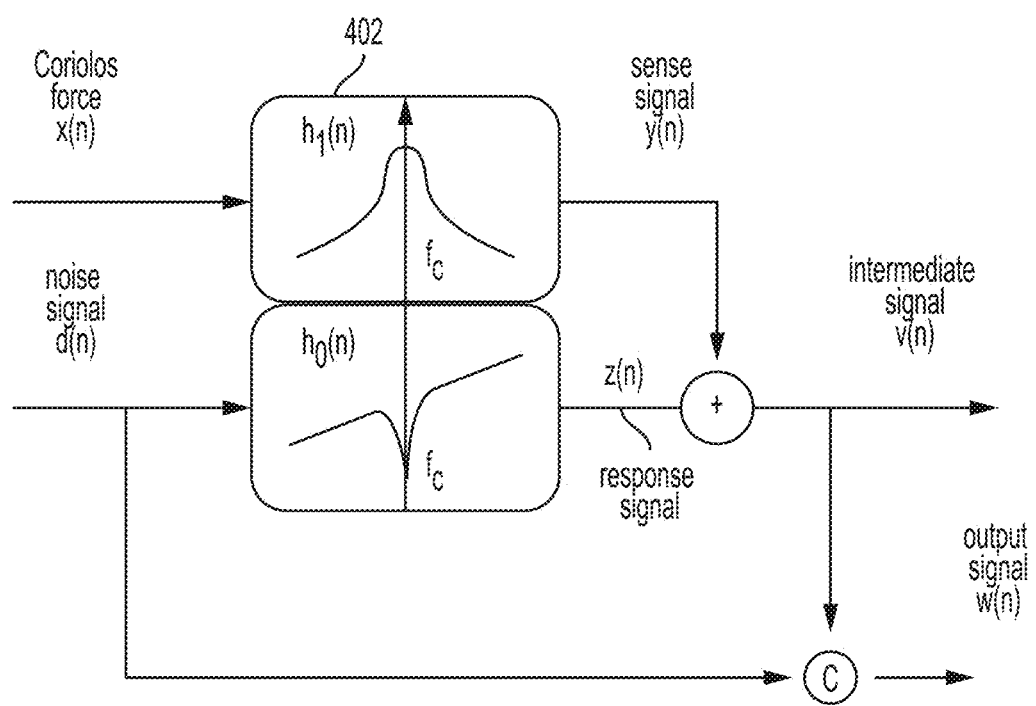
FIG. 7A is a block diagram of a system for detecting frequency mismatch in the presence of drive signal having a non-zero bandwidth, in accordance with some embodiments of the technology described herein.

An example system for limiting the effects of the non-zero bandwidth is illustrated in FIG. 7A, in which $h_1(n)$ represents the impulse response of sensor 402 and $h_0(n)$ represents the impulse response of system 400. Here, x(n) refers to the Coriolis force, y(n) to the sense signal, d(n) to the noise signal (which includes $d_1(n)$, $d_2(n)$, $d_1(n)$, $d_2(n)$, z(n) the response signal, v(n) an intermediate signal and w(n) the output signal. Symbols X and C will be used to indicate the convolution operator and the correlation operator, respectively.

In this case, v(n) includes two components $v_1(n)$ and $v_2(n)$ (defined, respectively, when d(n)=$d_1(n)$ and d(n)=$d_2(n)$). Here, $v_1(n)$ and $v_2(n)$ are given by $$v_1(n)=x(n) X h_1(n)+d_1(n) X h_0(n)$$

$$v_2(n)=x(n) X h_1(n)+d_2(n) X h_0(n)$$

Similarly, w(n) includes two components $w_1(n)$ and $w_2(n)$ (defined, respectively, when d(n)=$d_1(n)$ and d(n)=$d_2(n)$). Here, $w_1(n)$ and $w_2(n)$ are given by $$w_1(n)=d_1(n) C\, v_1(n)=d_1(n) C[x(n) X h_1(n)+d_1(n) X h_0(n)]=h_0(n)+[d_1(n) C\, x(n) X h_1(n)]$$

$$w_2(n)=d_2(n) C\, v_2(n)=d_2(n) C[x(n) X h_1(n)+d_2(n) X h_0(n)]=h_0(n)+[d_2(n) C\, x(n) X h_1(n)]$$

Since $d_2(n)=-d_1(n)$, then $$w_2(n)=h_0(n)-[d_1(n) C\, x(n) X h_1(n)]$$

adding w1(n) to w2(n) results in $$w_1(n)+w_2(n)=2h_0(n)$$

which depends solely on $h_0(n)$. Therefore, the result of computing $w_1(n)+w_2(n)$ is immune to the bandwidth of the signal associated with the input angular rotation rate Ω.

Figure 7B:
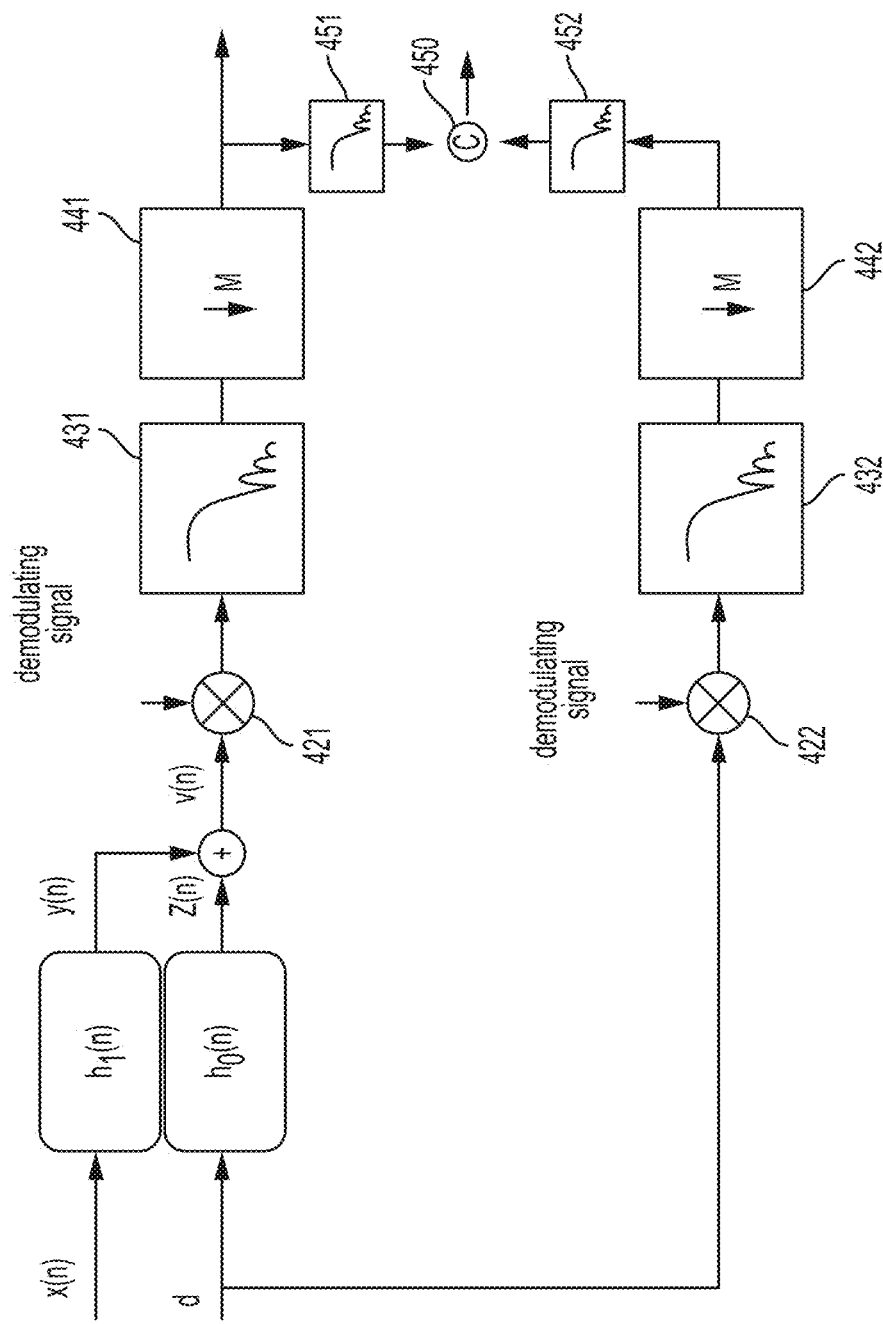
FIG. 7B is a block diagram of another system for detecting frequency mismatch in the presence of drive signal having a non-zero bandwidth, in accordance with some embodiments of the technology described herein.

Similarly to the case described above, detection of the frequency mismatch may be performed without having to detect an extended spectral portion of $h_0(n)$. This may be accomplished by using a demodulation scheme in the same fashion as described in connection with FIG. 4D. The resulting system is shown in FIG. 7B, in which mixers 421 and 422 are used for the demodulation. Optionally low-pass filters 431 and 432 and/or decimators 441 and 442 are used. In some embodiments, to further limit high-frequency spurious components, such as high-frequency tones in the demodulating signal, a pair of low-pass filters 451 and 452 may be used prior to the correlator 450.

Aspects of the technology described herein may provide one or more benefits, some of which have been previously described. Now described are some non-limiting examples of such benefits. It should be appreciated that not all aspects and embodiments necessarily provide all of the benefits now described. Further, it should be appreciated that aspects of the technology described herein may provide additional benefits to those now described.

Aspects of the technology described herein provide a computationally efficient method for detecting frequency mismatch in MEMS gyroscopes. This method may be used to compensate MEMS gyroscopes for frequency mismatch, thus significantly improving the gyroscope's ability to detect angular motion.

The terms "approximately", "substantially," and "about" may be used to mean within ±20% of a target value in some embodiments, within ±10% of a target value in some embodiments, within ±5% of a target value in some embodiments, and within ±2% of a target value in some embodiments. The terms "approximately" and "about" may include the target value.

What is claimed is:

1. A method for detecting a frequency mismatch in a gyroscope, the method comprising:
   applying a drive signal to the gyroscope;
   receiving a sense signal from the gyroscope; and
   detecting a frequency mismatch between the drive signal and the sense signal, the detecting comprising:
      generating a noise signal;
      demodulating the noise signal;
      demodulating a response signal obtained from the sense signal;
      correlating the demodulated noise signal with the demodulated response signal; and
      using a result of the correlating to detect the frequency mismatch.

2. The method of claim 1, wherein demodulating the noise signal and the response signal comprises demodulating the noise signal and the response signal by a frequency of the drive signal.

3. The method of claim 1, wherein the generating the noise signal comprises generating a pseudo-random bit sequence (PRBS).

4. The method of claim 3, wherein the PRBS comprises a first sub-sequence and a second sub-sequence opposite the first sub-sequence.

5. The method of claim 1, wherein the response signal is obtained by modulating the sense signal with a delta-sigma modulator.

6. The method of claim 1, wherein using the result of the correlating to detect the frequency mismatch comprises determining a phase response by integrating the result of the correlating.

7. The method of claim 6, further comprising determining a magnitude of the frequency mismatch using the phase response.

8. The method of claim 6, further comprising adjusting a frequency of the drive signal based at least in part on the phase response.

9. The method of claim 1, wherein detecting a frequency mismatch between the drive signal and the sense signal comprises determining whether the drive signal and the sense signal oscillate at substantially equal frequencies.

10. The method of claim 1, further comprising decimating the demodulated noise signal and the demodulated response signal, and wherein correlating the demodulated noise signal with the demodulated response signal comprises correlating the decimated demodulated noise signal with the decimated demodulated response signal.

11. The method of claim 10, further comprising low-pass filtering the decimated demodulated noise signal.

12. A microelectromechanical (MEMS) apparatus comprising:
   a gyroscope; and
   circuitry coupled to the gyroscope and configured to:
      apply a drive signal to the gyroscope;
      receive a sense signal from the gyroscope;
      detect a frequency mismatch between the drive signal and the sense signal by:
         generating a noise signal;
         demodulating the noise signal;
         demodulating a response signal obtained from the sense signal;
         correlating the demodulated noise signal with the demodulated response signal; and
         using a result of the correlating to detect the frequency mismatch.

13. The MEMS apparatus of claim 12, wherein the circuitry comprises a pseudo-random bit sequence (PRBS) generator configured to generate the noise signal.

14. The MEMS apparatus of claim 13, wherein the PRBS generator is configured to generate the noise signal by generating a first sub-sequence and a second sub-sequence opposite the first sub-sequence.

15. The MEMS apparatus of claim 12, wherein the circuitry comprises a noise shaper configured to generate the response signal from the sense signal.

16. The MEMS apparatus of claim 12, wherein the circuitry comprises a first decimator for decimating the response signal and a second decimator for decimating the noise signal.

17. A microelectromechanical (MEMS) apparatus comprising:
   circuitry coupled to a gyroscope and configured to:
      drive the gyroscope with a drive signal;
      receive a sense signal from the gyroscope;
      detect a frequency mismatch between the drive signal and the sense signal by:
         generating a noise signal;
         demodulating the noise signal;
         demodulating a response signal obtained from the sense signal;
         correlating the demodulated noise signal with the demodulated response signal; and
         using a result of the correlating to detect the frequency mismatch.

18. The MEMS apparatus of claim 17, wherein the circuitry comprises a pseudo-random bit sequence (PRBS) generator configured to generate the noise signal.

19. The MEMS apparatus of claim 18, wherein the PRBS generator is configured to generate the noise signal by generating a first sub-sequence and a second sub-sequence opposite the first sub-sequence.

20. The MEMS apparatus of claim 17, wherein the circuitry comprises a noise shaper configured to generate the response signal from the sense signal.

* * * * *